United States Patent [19]

Seidel et al.

[11] Patent Number: 4,476,193

[45] Date of Patent: Oct. 9, 1984

[54] SULFUR CONTAINING LIGNIN MODIFIED ALKALINE EARTH TREATED PHENOLIC IMPREGNATING RESINS FOR CORE LAYERS OF HUMIDITY RESISTANT LAMINATES

[75] Inventors: Martin P. Seidel, Monroeville; Timothy J. Fuller, Pittsburgh, both of Pa.

[73] Assignee: Westinghouse Electric Corp., Pittsburgh, Pa.

[21] Appl. No.: 417,963

[22] Filed: Sep. 14, 1982

[51] Int. Cl.³ .................... B32B 27/04; B32B 27/42; B32B 31/12
[52] U.S. Cl. .................... 428/531; 428/537.5; 428/697; 428/698; 428/699; 156/335
[58] Field of Search .............. 428/514, 531, 537, 698, 428/699

[56] References Cited

U.S. PATENT DOCUMENTS 3,897,589  7/1975  Meier .................... 428/531 X
4,060,450 11/1977  Palazzolo et al. ........ 428/531 X

FOREIGN PATENT DOCUMENTS 48-11827  4/1973  Japan .................... 428/531

Primary Examiner—Patricia C. Ives
Attorney, Agent, or Firm—D. P. Cillo

[57] ABSTRACT

A resin containing laminate is made, where the resin comprises the cured admixture of phenolic resin, sulfur containing lignin, and a catalytic reactant containing 50 wt. % to 100 wt. % of an alkaline-earth compound and 0 wt. % to 50 wt. % of an alkali-metal compound.

10 Claims, 3 Drawing Figures

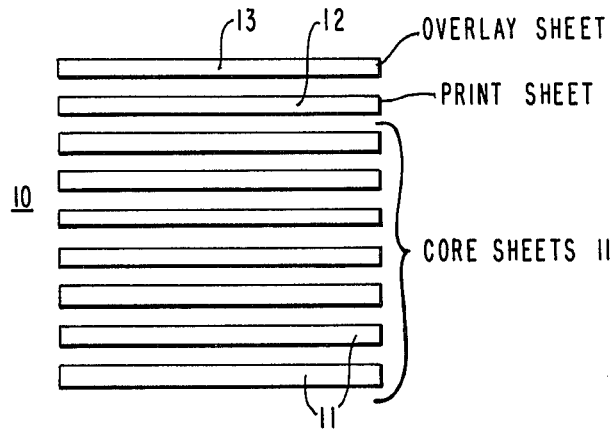
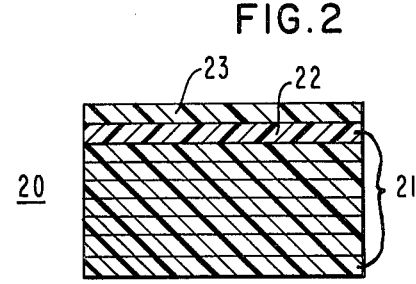
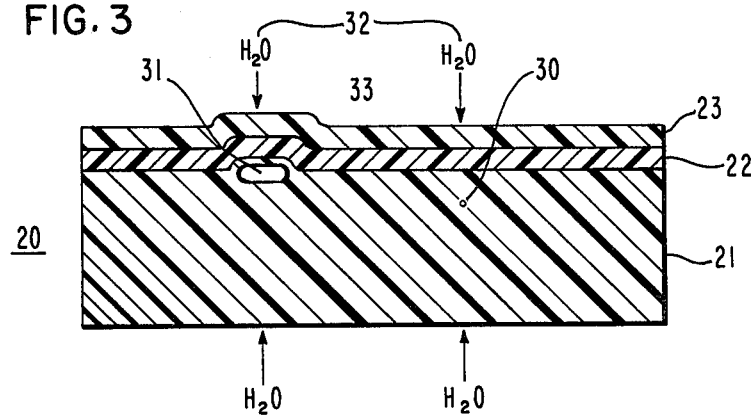

SULFUR CONTAINING LIGNIN MODIFIED ALKALINE EARTH TREATED PHENOLIC IMPREGNATING RESINS FOR CORE LAYERS OF HUMIDITY RESISTANT LAMINATES

BACKGROUND OF THE INVENTION

High-pressure decorative laminates have been widely employed in the building industry as counter and table tops, bathroom and kitchen work surfaces, furniture, cabinets, wall paneling, partitions, and doors. Because they are durable and resistant to scratching and heat, high-pressure decorative laminates have been popular in the furniture industry, primarily as tops for furniture.

High-pressure decorative laminates are laminated articles comprising plural layers of resin impregnated paper sheets, consolidated or bonded together into a unitary structure under heat and pressure. Conventionally, the decorative or print layer is a sheet of high quality, purified alpha cellulose fibers, which may contain various fillers and/or pigments, impregnated with a thermosetting condensation resin, such as aminotriazine-aldehyde resins, for example, melamine-formaldehyde resins. An overlay sheet, transparent when cured, may be employed to protect the decorative or print layer and is also a sheet of alpha cellulose fibers, or the like, impregnated with an aminotriazine aldehyde resin.

The overlay and print sheets are bonded to a plurality of core or body sheets of fibrous cellulosic material, usually Kraft paper, most generally impregnated with a thermosetting phenol-formaldehyde resin. The major portion of the paper in a decorative laminate is composed of the core or body sheets rather than the print or overlay sheets. Typically seven to eleven core sheets are consolidated with only a single print and a single overlay sheet, to form a conventional 1/16 inch decorative laminate.

Although the core sheets are less expensive than the print or overlay sheets, it is apparent that the core sheets are a significant cost factor, because of their volume in a decorative laminate. It is also apparent that many of the properties of the paper-base decorative laminates are derived from the papers employed as well as the resins employed therein. The properties of the core stock paper and resin, then, will influence the properties of the end product decorative laminate. Such high-pressure decorative laminates are well known, and taught for example by Palazzolo et al., in U.S. Pat. No. 4,060,450, where the Kraft paper core sheets were made from hardwood and softwood cellulosic fibers containing up to a 15 percent lignin content.

A variety of problems are associated with high-pressure decorative laminates. The phenolic resin used to impregnate the core sheets is usually a mixture of phenol, aqueous aldehyde such as formaldehyde, and sodium hydroxide, the latter component of which is an alkaline condensation material tha catalyzes yet controls the reaction, and allows a high phenol:formaldehyde mole ratio, i.e., up to about 1:1.5. The use of acidic materials, such as strong organic or inorganic acids, as condensation catalysts could lead to explosive reactions. Recently, the cost of phenol has dramatically increased, since it is a by-product of the chemical processing of crude oil fractions. Additionally, in very high humidity or tropical climates, these types of laminates have a tendency to absorb water and to blister over a period of years, causing possible complete disintegration of the laminate core.

Read, in U.S. Pat. No. 3,551,405, attempted to solve phenol cost problems by substituting desulfonated lignin for from 15 percent to 65 percent of the phenol. Read pre-reacted lignosulfonates with caustic alkali, such as sodium hydroxide, in the presence of alcohol at 250° C. and about 600 psi., and then acidified the product to produce sulfur free lignin precipitate solids. This sulfur free lignin was then added to a phenolic resin, consisting of an admixture of phenol, aqueous formaldehyde and sodium hydroxide. The mixture was then diluted with major amounts of alcohol, to provide a low viscosity impregnating resin for Kraft paper core sheets. After impregnation into eighteen sheet core lay-ups, drying to the "B" stage, and consolidation at 1,250 psi. and 150° C. for 30 minutes, laminated cores were produced having weight increase values of from 3.1 wt. % to 27.6 wt. %, due to water absorption, presumably at 25° C. for a 24 hour period.

The Read process, while dramatically reducing phenol costs, does not appear to solve long term blistering problems, involves complicated sulfonated lignin pretreatment, and introduces a major quantity of alcohol diluent that could pose pollution problems during "B" stage drying. Additionally, unless the alcohol is somehow recovered during "B" stage drying or lamination, its use would considerably offset the phenol cost saving. There has been a long felt need for a simplified process of manufacturing humidity resistant, high-pressure decorative laminates, that would allow substantial phenol substitution, not add to pollution problems, and which would completely eliminate high humidity, long range blistering problems.

SUMMARY OF THE INVENTION

The above problems have been solved and the above needs met by providing a Kraft paper core impregnating resin consisting of: phenol, aqueous aldehyde such as aqueous formaldehyde, sulfur containing lignin, preferably sulfonated lignin, and a catalytic reactant selected from certain alkaline-earth metal compounds. The alkaline-earth metal compounds are selected from calcium oxide, calcium hydroxide, barium oxide, barium hydroxide, their hydrates, and their mixtures. To these compounds, may be added up to 50 wt. % of an alkali-metal compound, such as an oxide or hydroxide, for example sodium hydroxide. Preferably the catalytic reactant will be 100 wt. % calcium hydroxide.

The weight ratio of phenol:sulfur containing lignin can range up to about 1:0.4. The mole ratio of phenol:-catalytic reactant can usually range up to about 1:0.05; but in all cases the amount of basic catalytic reactant must be effective to provide a pH of over about 7.5 for the total admixture. The mole ratio of phenol:formaldehyde can range up to about 1:1.6. The term "sulfur containing lignin" is meant to include a lignin material containing at least one of sulfonates, sulfates, sulfites or sulfides.

It is thought that the sulfur component of the lignin can interact with alkaline-earth oxides or hydroxides, such as calcium hydroxide, either during the formaldehyde-phenol condensation or during high pressure laminating at temperatures over about 130° C., to provide water-insoluble materials which will not attract atmospheric water, thus dramatically reducing osmotic pressure effects in the core, and resultant blistering. This interaction may also to take place with alkali metals such as sodium, potassium, or lithium, however, when used alone, ionic components are liberated which are water soluble and which attract atmospheric water.

Thus, both the sulfur component of the lignin, and the alkaline-earth metal compound are necessary to prevent blistering, while, of course, the lignin substitutes up to 40 wt. % for phenol. Laminates produced using this core impregnating resin are resistant to blistering even when immersed in boiling water for more than 18 hours.

BRIEF DESCRIPTION OF THE DRAWINGS

For a better understanding of the invention reference may be made to the preferred embodiment, exemplary of the invention shown in the accompanying Drawings, in which:

FIG. 1 is a schematic view of an assembly of sheets constituting a stack-up for a high pressure laminate;

FIG. 2 is a cross-sectional view of a heat and pressure consolidated laminate; and FIG. 3 is a cross-sectional view of a prior art laminate, containing water soluble salts, such as $Na_2SO_4$, and resultant water absorption and blistering.

DESCRIPTION OF THE PREFERRED EMBODIMENTS

Referring now to FIG. 1 of the Drawings, the stack-up assembly 10 is composed of a plurality of core sheets 11 prepared by impregnating the core stock paper with a phenol-aldehyde resin solution. The impregnated paper is heated to drive off the solvent and to advance the thermosetting resin to a dry, non-tacky but fusible "B" stage. Similarly a print or pattern sheet 12 is prepared by impregnating an alpha cellulose paper with a melamine-aldehyde solution, heating to drive off the solvent and to advance the resin to a dry, non-tacky but fusible "B" stage. The print or pattern sheet 12 carries the decorative print or pattern provided by either pigmenting the paper or by printing a design thereon.

An overlay sheet 13, similar to sheet 12 but carrying no print or pattern may be employed to provide additional protection for the decorative pattern. Sheets 12 and 13 are superposed upon the core sheets 11, as shown, and the stack-up assembly 10 is placed between stainless steel caul plates and inserted into a hydraulic press with heated platens. At a temperature in the order of 130° C. to 150° C. and a pressure of 700 psi to 1,500 psi, the assembly is cured and consolidated into the unitary structure illustrated in FIG. 2, after a total residence time in the order of 30 to 60 minutes. It is important in this invention to use press temperatures over about 130° C., preferably from about 140° C. to about 150° C., to cure the resins and to continue the interaction between the components of the resin to form water insoluble salts.

Referring now to FIG. 2, the high-pressure decorative laminate 20 is composed of a core 21, a decorative print or pattern sheet 22 and a transparent protective overlay sheet 23, consolidated and bonded together to form a unitary structure. FIG. 3 shows a prior art laminate 20 with core 21, which contains water soluble salts such as $Na_2SO_4$, shown greatly magnified as 30, in an initial stage. The water void 31, produced at a later stage of time due to absorption of water 32 from the atmosphere, causing blister 33 in the print and overlay layers 22 and 23, is also shown. Of course the salts 30 are distributed throughout the core 21. It is this degradation process that this invention completely eliminates.

The spent liquor obtained from sulfate wood pulping processes contains lignin material in solution. Lignin is an exceedingly complex, three-dimensional branched-chain amorphous polymer, built up of phenyl propane-type units. In chemical pulping, chemicals are used, under pressure, to dissolve and remove most of the cementing lignin and wood sugars in the wood structure to provide long cellulose fibers suitable primarily for paper making. The spent liquor is then separated from the cellulose fibers by screen filtration. The active chemical pulping ingredient is most commonly a sulfite or sulfate of sodium. In general, hardwood contains a smaller concentration of lignin than softwoods, but hardwood lignin is more readily removed than softwood lignin in most chemical pulping processes.

Lignins are precipitated from the spent liquor of the wood pulping process by treatment with gaseous carbon dioxide. They are separated from the water by means of a short fourdrinier screen, to provide a sheet which is treated with gaseous ammonia to facilitate subsequent dehydration of the lignin product to an essentially moisture-free amorphous product. These lignin materials are well known and commercially available from a variety of sources. These lignin materials contain a wide variety of residual salts and ionic species impurities such as sulfonates, sulfates, sulfites, sulfides, ammonium tied to sulfur groups, and possibly also carbonates and bicarbonates.

These impurities can be precipitated to form water-insoluble, chemically inert salts, such as alkaline-earth sulfates, which do not contribute to the ionic strength of phenolic resins when incorporated therein. Due to the interaction of the sulfur component of the lignin with the alkaline-earth metal during both the phenol-formaldehyde condensation and the high pressure laminating at about 130° C. to about 150° C., water-soluble salts are eliminated. Mere mixture of all components at 50° C. to 100° C. to form a phenolic resin will not completely eliminate all water-soluble salts. The precipitated water-insoluble salts do not induce high osmotic pressure conditions in the cured laminate structure, thus eliminating blistering and disintegration caused by water attraction to water-soluble salts.

Useful alkaline-earth metal compounds are selected from calcium oxide, calcium hydroxide, barium oxide, barium hydroxide, hydrates thereof and their mixtures. Magnesium compounds are not useful because of their extreme water-insolubility, and strontium compounds are not useful because of their high toxicity. Carbonates are not useful because of their extreme water-insolubility, and chlorine or bromine compounds likewise are not useful. These selected alkaline-earth oxides, hydroxides, and their hydrates can be used as complete or partial substitutes for alkali-metal containing condensation catalysts, such as sodium hydroxide in the production of phenol-formaldehyde impregnating resins for laminate core sheets.

These alkaline-earth materials serve the dual purpose of acting not only as condensation catalyst to control the reaction at high phenol:formaldehyde mole ratios, but also of eliminating water attracting ionic species in added lignin materials by causing a precipitation of water-insoluble salts. Any ammonium present is converted to ammonium hydroxide and volatized during heating to form the phenolic resin. The catalytic reactant is composed of from 50 wt. % to 100 wt. %, preferably 100 wt. %, of the selected alkaline-earth compounds heretofore described, and from 0 wt. % to 50 wt. %, of an alkali-metal compound, such as an oxide or hydroxide, usually sodium hydroxide, potassium hydroxide or lithium hydroxide. A good practical range would be from 60 wt. % to 95 wt. % of an alkaline-earth compound, and from 5 wt. % to 40 wt. % of an alkali-metal compound. Use of less than the optimum amount, and certainly less than 50 wt. % of the selected alkaline-earth compound will not effectively reduce water attracting ionic materials, and will allow long range water absorption into the laminate, resulting in blistering and possible desintegration in high humidity environments. The effective amount of selected alkaline-earth compound is a function of the reactive sulfur present in the lignin material used.

The catalytic reactant can be added to the lignin first and the mixture added to the phenol and formaldehyde, or it can be added to the phenol and lignin, followed by formaldehyde addition; or it can be added to the admixture of phenol, formaldehyde and lignin. In making the phenolic impregnating resin, admixture at 50° C. to 100° C. for about 30 minutes is the usual procedure. The catalytic reactant can be added as an aqueous solution or as a suspension, depending on which alkaline-earth compound is used. For example, barium hydroxide is soluble in water (95 g/100 cc), whereas calcium hydroxide is only slightly water-soluble (0.77 g/100 cc). Both are however effective to remove water-soluble salts from lignin, and to catalyze the condensation reactions between phenol and formadehyde.

Resins made with barium hydroxide are completely free of suspended material, while those made with calcium hydroxide may have some suspended material, however most of the calcium hydroxide is soluble in phenol at the 50° C. to 100° C. mixing temperatures. Calcium hydroxide, however, would provide a substantial cost advantage over barium hydroxide in a commercial process. When barium hydroxide is used, care must be taken that the lignin contains sufficient reactive impurity ions so that $Ba^{+2}$ is tied up. Also, when calcium hydroxide or barium hydroxide are used, storage conditions must prohibit reaction with atmospheric carbon dioxide to form carbonates.

The amount of total catalytic reactant, i.e., selected alkaline-earth compound plus any alkali-metal compound, must be an amount effective to act as condensation catalyst for the phenolic resin formation, act effectively to allow up to 40% lignin substitution, and provide a pH of the total impregnating resin admixture of between about 7.5 and about 9.0. The useful mole ratio of (phenol):(catalytic reactant) to meet the above criteria is usually up to about (1):(0.05), and preferably from (1):(0.002 to 0.04). The pH of phenol is usually about 6, while the pH of formaldehyde can vary from 4 to 7 depending on its purity. If very acidic formaldehyde is used, the upper limit of catalytic reactant base will be required to adjust the pH of the total admixture, i.e., phenol, formaldehyde, lignin and catalytic reactant up to at least about 7.5. The mole ratio of phenol:aldehyde such as formaldehyde can range from about 1:1 up to about 1:1.6. The weight ratio of phenol:sulfur containing lignin can range from about 1:0.05 up to about 1:0.4. Over 40% lignin substitution for the phenol, the resin cannot be impregnated into the Kraft paper sheets.

EXAMPLE 1

Four, impregnated, cured laminates were made using sulfur containing lignin modified, alkaline-earth treated, phenolic impregnating resins, along with one control laminate. The table of reactants is shown below in Table 1:

TABLE 1

| Sample No. | Phenol (g;mol) | Lignin (g) | Alkaline-Earth Compound (g;mol) | Alkali-Metal Compound (g;mol) | Formaldehyde $CH_2O$, 37 wt. % (g;mol) | pH of Total Admixture |
|---|---|---|---|---|---|---|
| 1 | 188;2 | 56a | $Ba(OH)_2.8H_2O$ 4;0.013 | — | 240;3 | 7.5 |
| 2 | 188;2 | 56a | $Ca(OH)_2$ 6;0.0804 | — | 240;3 | 8.0 |
| 3 | 188;2 | 56b | $Ca(OH)_2$ 5;0.067 | — | 240;3 | 8.1 |
| 4 | 188;2 | 56b | $Ba(OH)_2.8H_2O$ 8;0.026 | NaOH 1.5;0.038 | 240;3 | 7.9 |
| *5 | 188;2 | 40b | — | NaOH 2.4;0.06 | 240;3 | 8.0 | a = Indulin AT;
b = Reax 27;
* = Control Comparative Sample

Sample numbers 1, 2, 3 and 4 used synthesis procedure 1, and Sample number 5, the comparative Sample, used synthesis procedure 2. In synthesis procedure 1, the lignin was dissolved in molten phenol. The alkaline-earth hydroxide hydrate was added as an aqueous solution, and the alkaline-earth hydroxide was added as an aqueous suspension. The alkali-metal compound, if used, was also added at this point, 16 wt. % of the catalytic reactant in Sample number 4 based on 8 g.Ba(OH)$_2$.8H$_2$O. The alkaline reaction mixture, at a pH of between about 7.0 to 8.4, was heated between 50° C. and 100° C. for about 30 minutes to volatize any ammonia or other volatile components. Aqueous 37 wt. % formaldehyde was then added. The pH was monitored and additional alkaline-earth caustic was added if the pH fell below 7.5. The reaction mixture was then refluxed for 90 minutes to a temperature of 95° C. to 100° C. The resultant resin (40% to 60% solids with 70% to 90% overall yield) was used in an impregnant dip process to treat Kraft paper to a weight ratio of between 1.2 to 2.2, i.e., 1.2 to 2.2 lbs. resin plus paper/1 lb. paper.

The impregnated Kraft paper was then passed through a heating oven to "B" stage the resin, and then it was cut into suitable pre-preg sheets. These sheets were then stacked to form 8 ply core stack-ups. The stack ups were placed between caul plates and inserted into a hydraulic press with heated platens. The stack-ups were then heat and pressure consolidated at 1,000 psi. and 150° C. for 30 minutes, cooled, and removed to provide unitary, bonded core laminates. Laminates made in this way were then tested for water-blistering by immersion in water at a temperature of 100° C. until failure.

In synthesis procedure 2, used for comparative Sample number 5, containing no alkaline-earth compound, an aqueous solution of sodium hydroxide was added to lignin that was dissolved in molten phenol at between 60° C. and 70° C. The resultant mixture was then heated between 90° C. and 100° C. with constant stirring until ammonia and other volatile components were no longer alkaline to moist pH paper. This procedure took about 1 hour. Aqueous 37 wt. % formaldehyde was then added, and the stirred reaction mixture was heated for 90 minutes at 90° C. to 100° C. Laminates were then made and tested as described heretofore in synthesis procedure 1. The lignin used in Sample numbers 1 and 2 was a softwood lignin (sold by Westvaco Corp. as Indulin AT). The lignin used in sample numbers 3, 4 and 5 was a softwood lignin (sold by Westvaco Corp. as Reax 27). Results of the hot water immersion blistering tests are shown below in Table 2:

TABLE 2

| Sample No. | Water Boil Test Hr. to Blister Laminates | Catalytic Reactant |
|---|---|---|
| 1 | 97a | Ba(OH)$_2$.8H$_2$O |
| 2 | 41 | Ca(OH)$_2$ |
| 3 | 20 | Ca(OH)$_2$ |
| 4 | 24 | Ba(OH)$_2$.8H$_2$O + NaOH (16 wt. %) |
| *5 | 3 | NaOH | a = test discontinued;
*Control Comparative Sample

The lignin substitution in Sample numbers 1 to 4 was 56 g./(188 g+56 g)=23% and would provide a substantial cost advantage. The mole ratio of phenol:formaldehyde in all Samples was 1:1.5 the mole ratio of phenol:catalytic reactant, i.e., alkaline-earth plus any alkali-metal compounds was 1:0.007; 1:0.040; 1:0.03; and 1:0.03 for Sample numbers 1, 2, 3 and 4 respectively. As can be seen from Tables 1 and 2, the use of calcium and barium alkaline-earth compounds dramatically improves blistering resistance of the core laminates. It was found that the phenol-formaldehyde resin produced by incorporating calcium and barium alkaline-earth compounds had essentially zero ionic strength.

We claim:

1. A moisture resistant, high pressure consolidated laminate, containing at least a core layer of a plurality of resin impregnated core sheets, the core impregnating resin comprising the cured admixture of:
   (A) phenol,
   (B) aldehyde,
   (C) sulfur containing lignin, and
   (D) an effective amount of catalytic reactant consisting essentially of:
      (i) 50 wt. % to 100 wt. % of an alkaline-earth metal compound selected from the group consisting of calcium oxide, calcium hydroxide, barium oxide, barium hydroxide, hydrates thereof, and mixtures thereof, and
      (ii) 0 wt. % to 50 wt. % of an alkali-metal compound, said core impregnating resin bonding the core sheets together.

2. The laminate of claim 1, wherein the core impregnating resin is cured under pressure at a temperature of over about 130° C., the mole ratio of (phenol):(aldehyde) is from about (1):(1) to about (1):(1.6), the mole ratio of (phenol):(catalytic reactant) is from about (1):(0.002) to about (1):(0.05), and the weight ratio of (phenol):(sulfur containing lignin) is from about (1):(0.05) to about (1):(0.4).

3. A moisture resistant, high pressure consolidated laminate, containing at least a core layer of a plurality of resin impregnated core sheets, the core impregnating resin consisting essentially of the cured admixture of:
   (A) phenol,
   (B) formaldehyde,
   (C) sulfur containing lignin, and
   (D) catalytic reactant consisting essentially of:
      (i) 50 wt. % to 100 wt. % of an alkaline-earth metal compound selected from the group consisting of calcium oxide, calcium hydroxide, barium oxide, barium hydroxide, hydrates thereof, and mixtures thereof, and
      (ii) 0 wt. % to 50 wt. % of an alkali-metal compound, where the mole ratio of (phenol):(formaldehyde) is from about (1):(1) to about (1):(1.6), the weight ratio of (phenol):(sulfur containing lignin) is from about (1):(0.05) to about (1):(0.4), the catalytic reactant is added in an amount effective to provide a pH of the resin admixture of between about 7.5 and about 9.0, and the resin is cured under pressure at a temperature of over about 130° C., said core impregnating resin bonding the core sheets together.

4. The laminate of claim 3, where the mole ratio of (phenol):(catalytic reactant) is from about (1):(0.002) to about (1):(0.05).

5. The laminate of claim 3, where the catalytic reactant is selected from the group consisting of calcium hydroxide, barium hydroxide, hydrates thereof, and mixtures thereof.

6. The laminate of claim 3, where the core layer comprises a plurality of layers of Kraft paper.

7. The laminate of claim 6, having a print sheet layer laminated thereto.

8. The laminate of claim 1, where the alkali-metal compound of the catalytic reactant is selected from alkali-metal oxides and alkali-metal hydroxides.

9. The laminate of claim 1, where the catalytic reactant is selected from the group consisting of calcium hydroxide, barium hydroxide, hydrates thereof, and mixtures thereof.

10. The laminate of claim 3, where the alkali-metal compound of the catalytic reactant is selected from alkali-metal oxides and alkali-metal hydroxides.

* * * * *